United States Patent [19]
Nakakomi

[11] Patent Number: 5,581,751
[45] Date of Patent: Dec. 3, 1996

[54] KEY EXTRACTION APPARATUS AND A KEY EXTRACTION METHOD

[75] Inventor: Hiroshi Nakakomi, Kanagawa, Japan

[73] Assignee: Mitsubishi Denki Kabushiki Kaisha, Tokyo, Japan

[21] Appl. No.: 115,303

[22] Filed: Aug. 31, 1993

[30] Foreign Application Priority Data

Sep. 22, 1992 [JP] Japan ................... 4-252742

[51] Int. Cl.⁶ .................... G06F 7/06; G06F 13/00
[52] U.S. Cl. ........................................ 395/602
[58] Field of Search .................... 395/600, 800; 340/146.2

[56] References Cited

U.S. PATENT DOCUMENTS

| | | | |
|---|---|---|---|
| 5,117,495 | 5/1992 | Liu ........................... | 395/600 |
| 5,210,870 | 5/1993 | Baum et al. .................. | 395/600 |

FOREIGN PATENT DOCUMENTS

| | | |
|---|---|---|
| 0364180 | 4/1990 | European Pat. Off. . |
| 0364179 | 4/1990 | European Pat. Off. . |
| 2-122328 | 5/1990 | Japan . |
| 3-71262 | 3/1991 | Japan . |
| 3-202934A | 9/1991 | Japan . |
| 4-7758A | 1/1992 | Japan . |

*Primary Examiner*—Paul V. Kulik
*Attorney, Agent, or Firm*—Wolf, Greenfield & Sacks, P.C.

[57] ABSTRACT

A key extraction apparatus comprises a main memory, a data input unit of the key extraction apparatus, a data-write controller which generates a data-write timing signal for writing data on a data memory, a data-write timing signal generated by the data-write controller, a data memory for writing data from the main memory, a processor which performs data transfer, sort processing and so on, a key memory which extracts key portions from the record written in the data memory and stores them, and a key-write controller which generates a key-write timing signal.

37 Claims, 16 Drawing Sheets

KEY EXTRACTION APPARATUS AND A KEY EXTRACTION METHOD

BACKGROUND OF THE INVENTION

1. Field of the Invention

The present invention relates to systems and methods for the use in a sort processing apparatus which sorts records regarding keys.

2. Description of the Related Art

FIG. 16 shows a conventional key extraction apparatus. It has a main memory 1 and a data input unit 2. A data-write controller 3 generates data-write timing signal 4 for writing data on a data memory 5. The data memory 5 stores some data transferred from the main memory 1. Processor 6 carries out data transfer and/or sort processing. A key memory 7 has some keys extracted from the records stored on the data memory 5 by the micro-processor.

On the main memory 1, there are plural fixed-length records including keys stored at the same locations within each record. FIG. 16 shows an example of the fixed-length records. Each record has seven words and there are some key fields at the same location within each record, for example, one key is located in the second word to the fourth word in a record.

Each record is inputted from the main memory 1 to the data input unit 2 of the key extraction apparatus. The data-write controller 3 provides each memory address for a data-write timing signal 4. The records are written sequentially on the data memory 5 when the timing signal 4 is positive. After writing a record on the data memory 5, the processor 6 extracts and reads a key from the record written on the data memory 5. The processor 6 then writes the key on the key memory 7. Then, the processor 6 sorts the records by using the contents of the key memory 7.

As stated above, the processor is used for extracting keys from the data in the conventional key extraction apparatus. In this conventional system, there are some problems, for example; time to extract some keys can become a part of processor overhead and it thus slows down the processing speed.

SUMMARY OF THE INVENTION

This invention seeks to solve the above problems by providing a key extraction apparatus which can extract key portions from the data at a high speed.

The key extraction apparatus according to one aspect of the present invention may include a data input means for inputting data having key portion, a key memory means for storing the key portion and key writing means for writing the key portion of the data to the key memory means in parallel with inputting the data of the data input means. It may further include a data memory means for storing the data, a data writing means for writing the data to the data memory means in parallel with inputting the data of the data input means.

The data input means inputs a plurality of records as the data, each of which has a fixed record length and includes a key portion at a predefined key position. The key writing means extracts the key portion from each record inputted by the data input means.

The key writing means may include a key position memory means for storing the key position of the key portion, a count means for counting a data position of the record inputted by the data input means, a comparison means for comparing the key position and data position, and a signal means for outputting a timing signal to the key writing means to write data to the key memory means. The key writing means may further include a reset means providing means for storing the record length, and means for resetting the key writing means when the data position counted by the count means reaches the record length.

The key position memory means stores a relative address of the key portion in the record to ensure the key position, and the count means counts a relative address of the data in the record to ensure the data position. The key position memory means stores a key-top position and a key-end position to ensure the key position. It further stores a plurality of key positions when each record has a plurality of key positions.

The key writing means may further include a key write position memory means for storing a plurality of key write positions each of which corresponds to each of the key portions in the record and each of which indicates a position of the key memory means in which to store the corresponding key portion. The signal means selects one of the key write positions stored by the key write position memory means, corresponding to the key portion to be stored by the key memory means, and outputs the key write position selected to the key writing means in case of outputting the timing signal.

The comparison means may include a comparator for comparing the key position stored by the key position memory means and the data position counted by the count means, and a hold means for holding a comparison result of the comparator. The signal means may output the comparison result to the key memory means in parallel with inputting data of the data input means.

The key extraction apparatus may further include a compare means for comparing the record with a predefined value, and prohibiting means for letting the key memory means prohibit storage of the key portion based on a comparison result of the compare means.

The key extraction apparatus may .further include an ID means for writing an identification of the record with the key portion when the key writing means writes the key portion to the key memory means.

In accordance with another aspect of the invention, both a sort processing system which may include the key extraction apparatus and a sort means for sorting the key portion stored by the key memory means, and a data base processing system which may include the key extraction apparatus and an access means for accessing the key portions stored by the key memory means as a file are provided.

In accordance with yet another aspect of the invention, a key extraction method is provided which may include the steps of inputting data serially, judging a key portion of the data inputted by the inputting step when the inputting step inputs the data, and extracting the key portion of the data based on a judgement of the judging step, when the inputting step inputs the data. The key extraction method may further include the step of storing a key position of the data before the inputting step. The judging step then operates on the key portion stored by the storing step and Judges the key portion of the data. The key extraction method may further include the step of repeating the inputting step, the judging step and the extracting step for extracting a plurality of key positions. The key extraction method may further include the step of outputting a key memory position for storing the key portion when the extracting step extracts the key portion. The key extraction method may further include the step of resetting the inputting step, the judging step and the extracting step for a new record wherein the inputting step inputs a plurality of records. The key extraction method may further include the step of storing the data inputted by the inputting step.

A key extraction apparatus of the present invention may also include a key writing means which extracts key portions from the data and writes them on the key memory in parallel with data inputting by the data input means. This makes it possible to extract key portions from the data at a high speed. It is another advantage of the invention that the load of the processor can be decreased and the processing efficiency can be improved because the processor is not used for extracting key portions.

DESCRIPTION OF THE PREFERRED EMBODIMENTS

Embodiment 1

The following is an embodiment of this invention described with reference to the drawings hereinafter.

Figure 1:
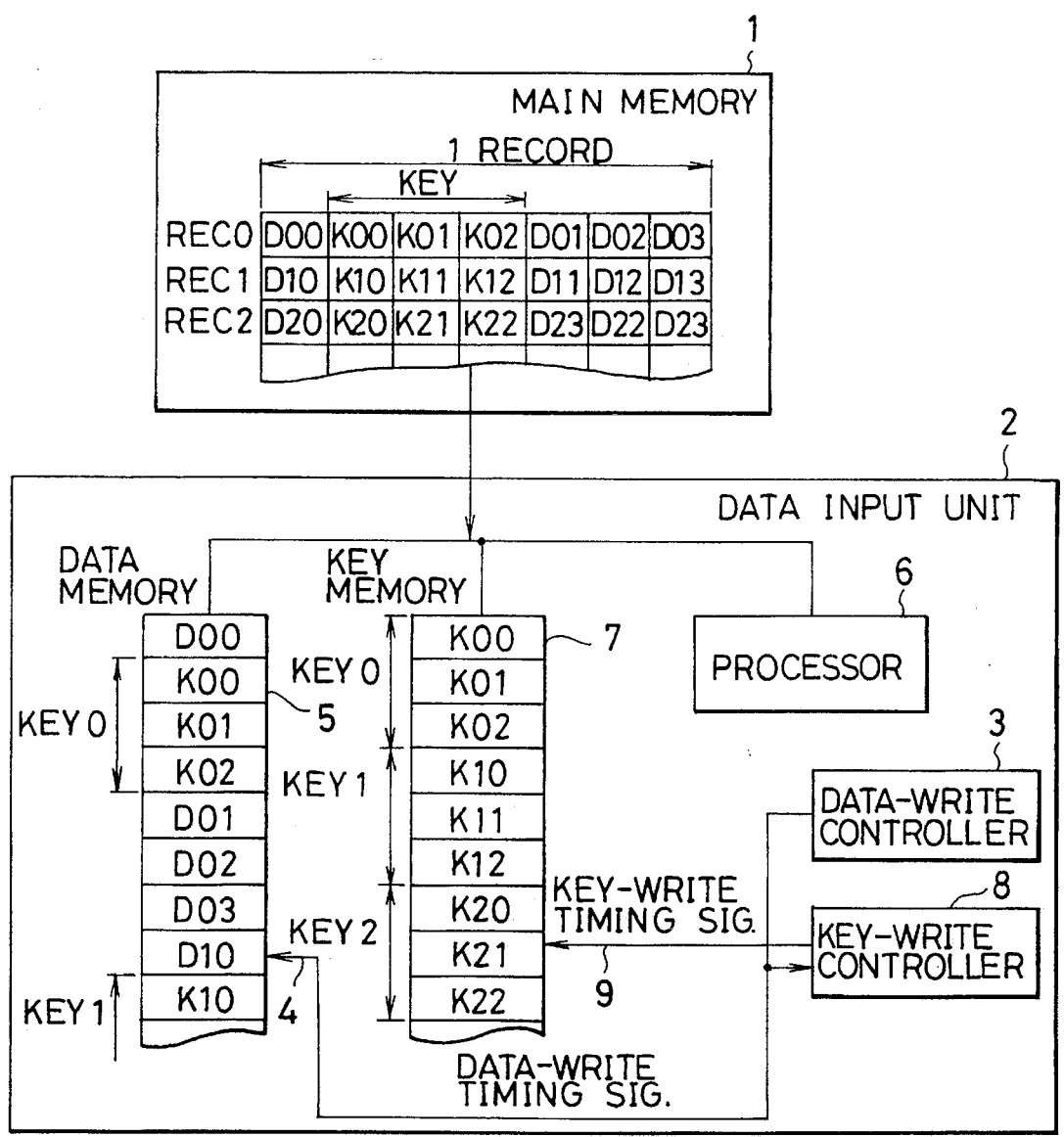
FIG. 1 shows the configuration of the key extraction apparatus in relation to Embodiment 1 of the present invention.

FIG. 1 shows a data input unit of a key extraction apparatus of this invention. A key-write controller 8 generates a key-write timing signal 9.

Figure 2:
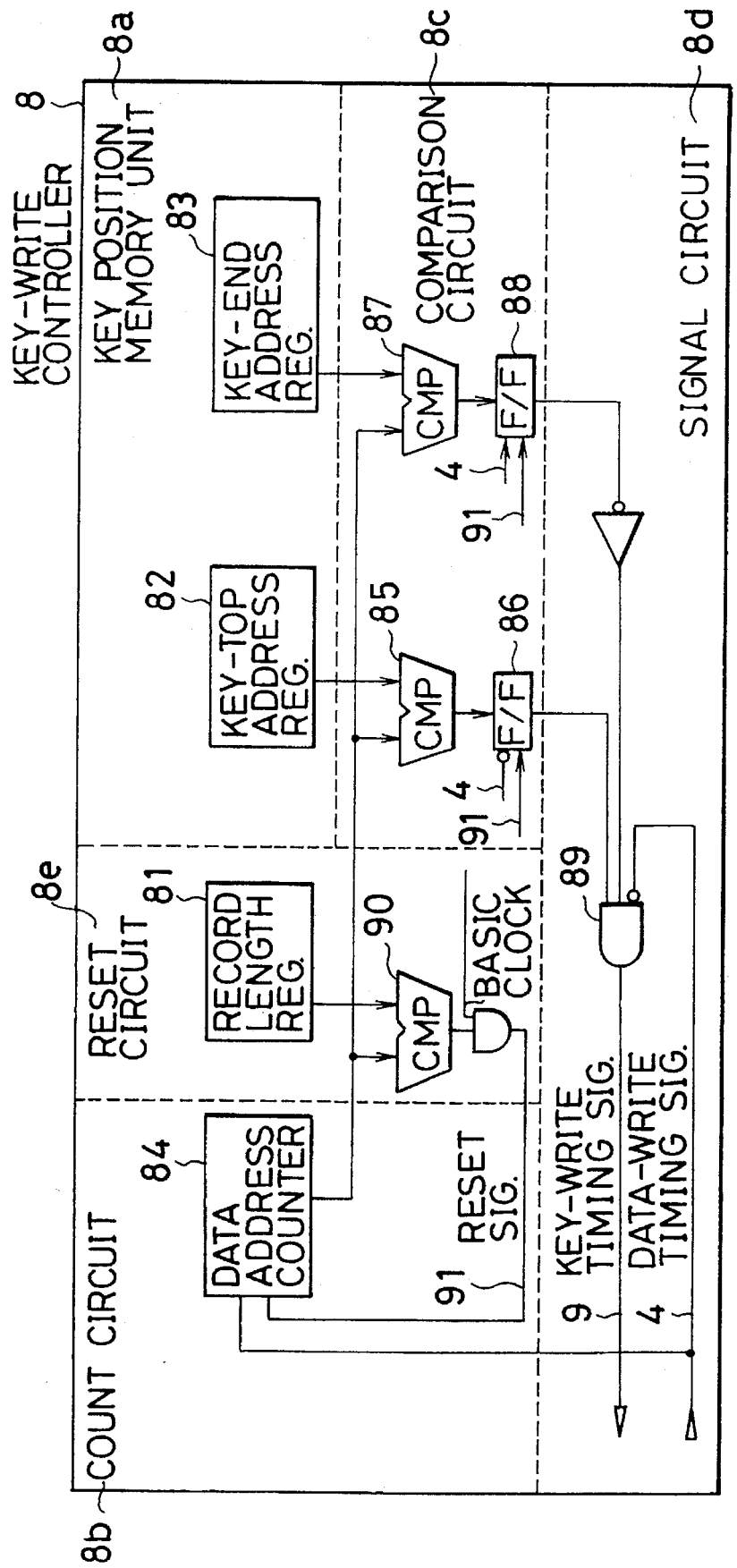
FIG. 2 shows the internal circuit of the key-write controller 8 in relation to Embodiment 1 of the present invention.

FIG. 2 shows the internal circuit of the key-write controller 8. A record length register 81 holds each record length. A key-top address register 82 holds a key top address as a relative address from the top of the record. A key-end address register 83 holds a key-end address as a relative address from the top of the record. A data address counter 84 counts addresses of the record as relative-addresses from the top of the record. The initial address of the data address counter 84 is zero (0). The counter 84 increments the address as each word of a record is written to the data memory from the main memory 1. After each transfer of a record, the counter 84 resets the initial address to 0.

A comparator 85 compares the key-top address held in the key-top address register 82 with the relative data address counted by the data address counter 84. If they are equal, the comparator 85 generates a key-top signal. A flip-flop 86 holds the key-top signal generated by the comparator 85 until the end of each record transfer.

A comparator 87 compares the key-end address held in the key-end address register 83 with the relative data address counted by the data address counter 84. If they are equal, the comparator 87 generates a key-end signal. A flip-flop 88 holds the key-end signal generated by the comparator 87 until the end of each record transfer.

An AND gate 89 generates a key-write timing signal 9. The output of the key-write timing signal 9 is synchronized with the timing for writing data from the top of the key to the end of the key.

A comparator 90 compares the record length held in the record length register 81 with the relative data address counted by the data address counter 84. The comparator 90 detects the end of each record based on the comparison result and outputs a reset signal 91 to the data address counter 84.

A key position memory unit 8a comprises the key-top address register 82 and the key-end address register 83. It stores a key position. A count circuit 8b counts a data position of the inputted record by using the data address counter 84. A comparison circuit 8c comprises the comparators 85 and 87 which compare a key position held in the key position memory unit with a data position counted by the count circuit 8b. The comparison circuit 8c also comprises the flip-flops 86 and 88 which hold a comparison result produced by the comparators. Based on the comparison result held in the flip-flops 86 and 88, a signal circuit 8d generates a timing signal for writing data to the key memory 7 at the timing of writing data into the data memory 5. A reset circuit 8e stores the record length in the record length register 81 and resets the key-write controller 8 when the data position counted by the count circuit 8b reaches the record length.

Figure 3:
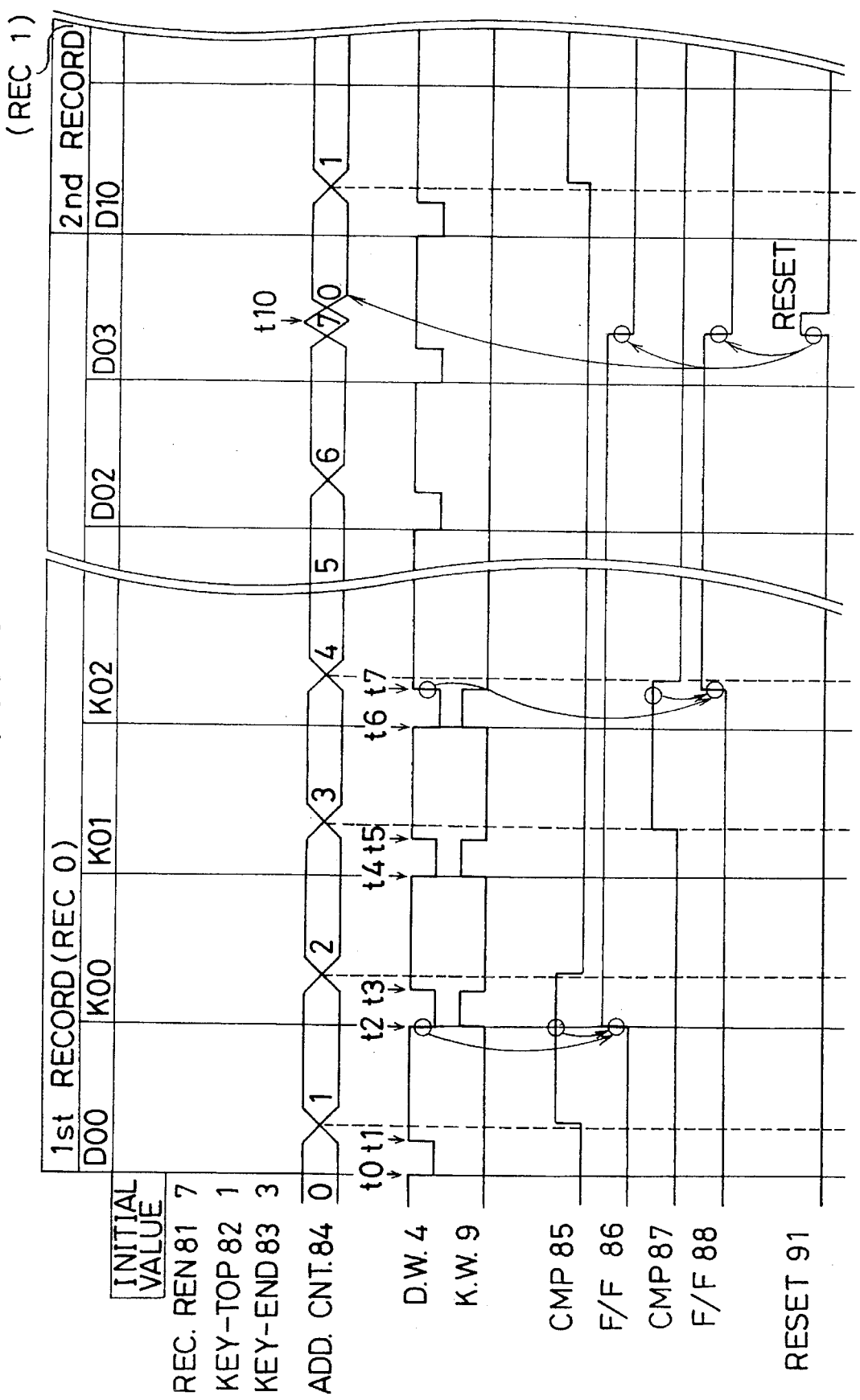
FIG. 3 shows a timing chart of the key-write controller 8 in relation to Embodiment 1 of the present invention.

The following describes the operation of this embodiment with reference to FIG. 3.

FIG. 3 is a timing chart of key-write controller 8. It shows a timing chart for inputting of data records as shown in FIG. 1.

A record length, a key-top address and a key-end address are written previously each on the record length register 81, the key-top address register 82 and the key-end address register 83 respectively.

For example, the record length shown in FIG. 1 is seven words. If the record-top address is 0, then the record-end address is 6. The key portion of the example record is three words, beginning with the second word. The key-top address is thus 1 and the key-end address is thus 3.

Therefore, at the beginning of the processing, the value of the record length register 81 is set to 7. The value of the key-top address register 82 is set to 1. The value of the key-end address register 83 is set to 3.

Data is inputted from the main memory 1 to the data input unit 2 of the key extraction apparatus. The data-write controller 3 generates a data-write timing signal 4. The inputted data is written sequentially on the data memory 5 at times indicated by the timing signal 4. The data-write timing signal 4 is inputted to the key-write controller 8. The data address counter 84 increments the address based on the data-write timing signal 4 at each writing of data on the data memory 5.

The data memory 5 stores the data word previous to the key-top address ("D00" of REC0 in FIG. 1) until the time t1. After t1, the comparator 85 generates a key-top signal when the address counted by the data address counter 84 equals to the address held in the key-top address register 82. Therefore, the flip-flop 86 is set ON at the time t2. During a term from t2 to t3, the data memory 5 stores the next data word, the first word of the key portion ("K00" of REC0) based on the data-write timing signal. During this term from t2 to t3, the AND gate 89 outputs the key-write timing signal 9 simultaneously with the data-write timing signal 4. The first data word of the key is written on the key memory 7 at the time indicated by the key-write timing signal 9.

Thereafter, keys are written sequentially both in the data memory 5 and the key memory 7 simultaneously until the end of the key ("K02" of REC0) is detected.

The data memory 5 stores the last word of the key during a term from t6 to t7. During this term from t6 to t7, the comparator 87 generates a key-end signal when the address counted by the data address counter 84 equals to the address held in the key-end address register 83. Therefore, the flip-flop 88 is set ON at the time t7. Thus, the key-write timing signal 9 is not generated beginning with the next data word ("D01" of REC0) and continuing until the end of the data transfer of one record.

The last data ("D03" of REC0) of one record is transferred until the time t10. The address held in the record length register 81 becomes equal to the address counted by the data address counter 84 at the time t10. Therefore, the comparator 90 generates the reset signal 91. The reset signal 91 resets the data address counter 84, the flip-flop 86 and the flip-flop 88.

In this way, the key-write controller 8 is initialized.

The above process is repeated for each record transfer. As a result, only the key portion of the data is extracted into the key memory 7.

Embodiment 2

As has been described, Embodiment 1 shows the case that the key-write controller comprises the key-top address register 82 which holds the key-top address as a relative address from the top of the record and the key-end address register 83 which holds the key-end address as a relative address from the top of the record. But these registers can be replaced by multiple address memory configurations. When using-multiple address memory configurations, plural keys can be embedded in each record. An example is shown in FIG. 4 and FIG. 5.

Figure 4:
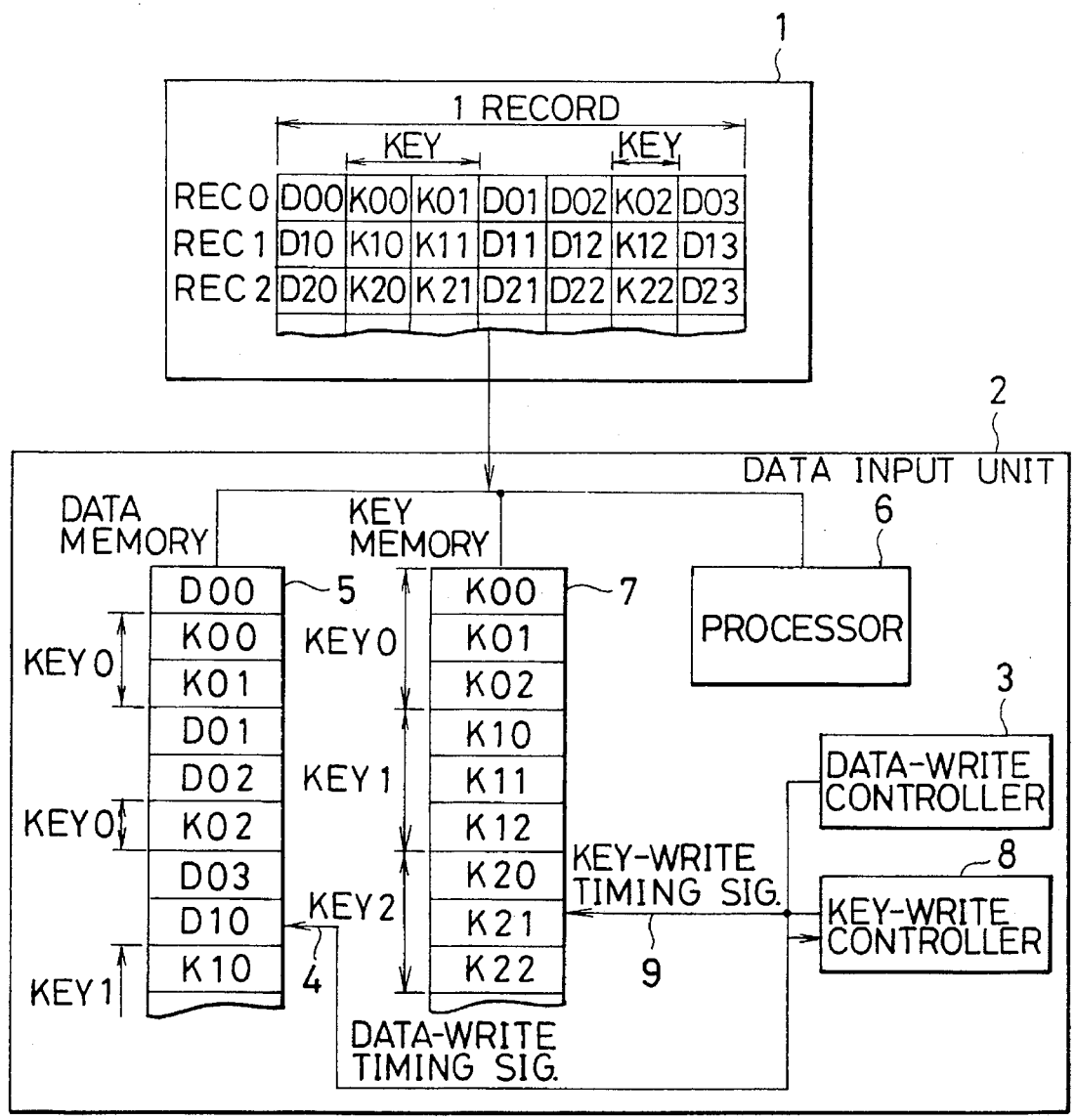
FIG. 4 shows the configuration of the key extraction apparatus in relation to Embodiment 2 of the present invention.

With reference to FIG. 4, each record of the data consists of seven words on the main memory 1. Each record has a key on the second word and the third word. Also, it has another key on the sixth word. Namely, one record has two keys in total.

Figure 5:
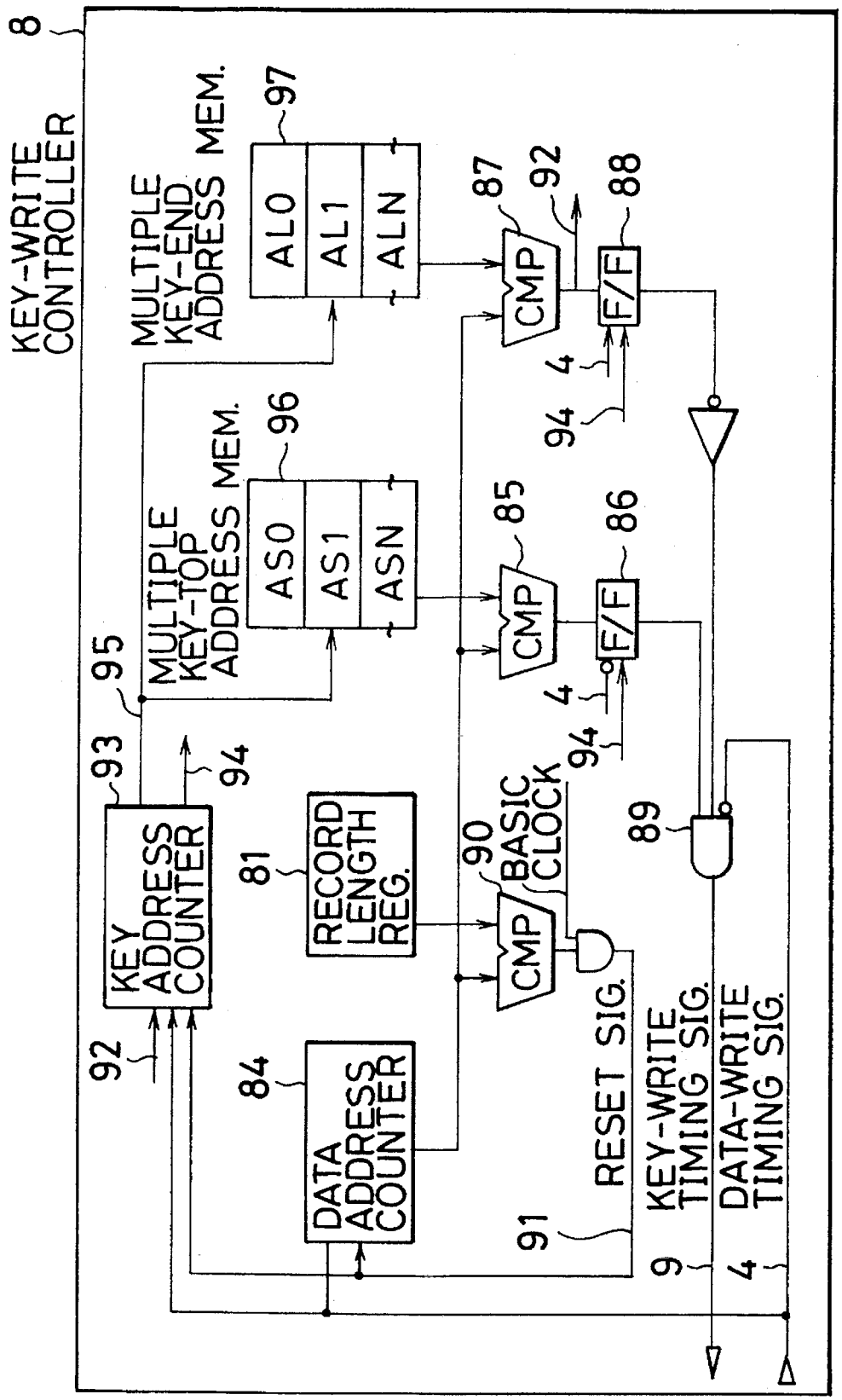
FIG. 5 shows the internal circuit of the key-write controller 8 in relation to Embodiment 2 of the present invention.

As shown in FIG. 5, a multiple key-top address memory 96 holds key-top addresses of plural keys and a multiple key-end address memory 97 holds key-end addresses of plural keys. In case of processing the record REC0 shown in FIG. 4, the multiple key-top address memory 96 holds AS0=1, AS1=5 as the key-top addresses. The other part of the memory 96, from AS2 to ASN, is not in use. The multiple key-end address memory 97 holds AL0=2, AL1=5 as the key-end addresses. The other part of the memory 97, from AL2 to ALN, is not in use. The comparator 87 outputs a key-end signal 92. The signal 92 is inputted to a key address counter 93. The key address counter 93 increments the address of the multiple key-top address memory 96 and the multiple key-end address memory 97 at a time based on the key-end signal 92. The key address counter 93 outputs a key-address output signal 95 to the key-top and key-end address memories 96 and 97 at the time based on the key-end signal 92. The key address counter 93 generates a reset signal 94 to reset the flip-flops 86 and 88 at a time based on the key-end signal 92.

Described hereinafter is the operation of this embodiment.

While the address counted by the data address counter 84 is between AS0, the address held in the multiple key-top address memory 96, and AL0, the address held in the multiple key-end address memory 97, the key-write timing signal 9 for the first key of the record is generated simultaneously with the data-write timing signal 4. Then, K00 and K01 of REC0 in FIG. 4 are written on the key memory 7 and the data memory 5 simultaneously.

After K00 and K01 are written on the key memory 7, the key address counter 93 increments the addresses of the multiple key-top address memory 96 and the multiple key-end address memory 97. While the address counted by the data address counter 84 is between AS1, the address held in the multiple key-top address memory 96, and AL1, the address held in the multiple key-end address memory 97, the key-write timing signal 9 for the second key of the record is generated simultaneously with the data-write timing signal 4. Then, K02 of REC0 in FIG. 4 is written on the key memory 7 and the data memory 5 simultaneously.

After finishing the transfer of a record, the key-write controller 8 is initialized. The above process is repeated for each record transfer.

Embodiment 3

In the above embodiments, the key memories are prepared and used separately from the processor. Instead, for example, key memories may be a part of the normal local memory of the processor, which can be used for storing key-top and key-end addresses.

Embodiment 4

Figure 6:
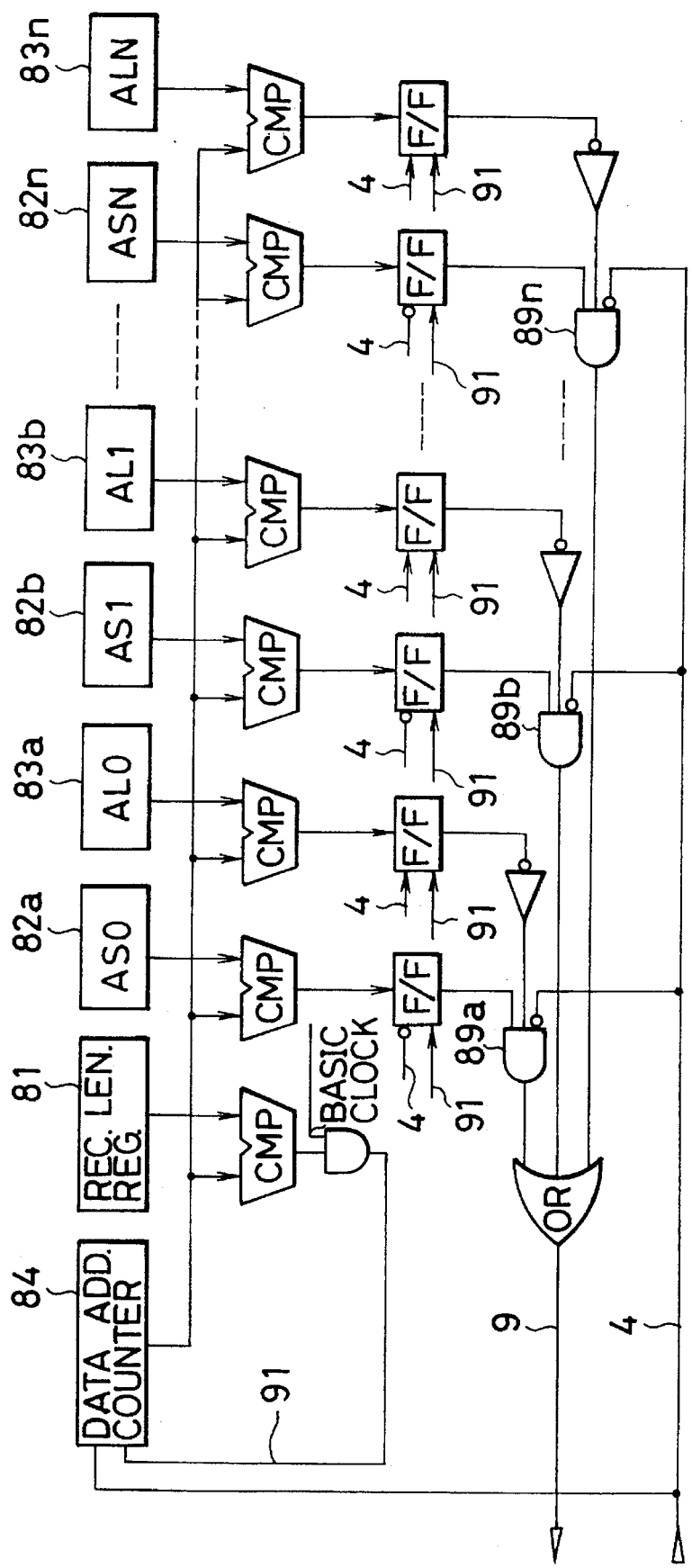
FIG. 6 shows the internal circuit of the key-write controller 8 configurated to have separate address memories for each address in accordance with Embodiment 4 of the present invention.

As has been described, Embodiment 2 shows that the address memories are set as follows; the multiple key-top address memory 96 stores only key-top addresses of plural keys and the multiple key-end address memory 97 stores only key-end addresses of plural keys. But, for example, each address memory can be a separate register for holding each address as shown in FIG. 6.

In this case, the key address counter 93 described in connection with Embodiment 2 is not needed.

Embodiment 5

As has been described, Embodiment 2 shows data having plural keys. The order in which plural keys of one record are to be stored in the key memory is the same as the order of the keys in the data.

Figure 7:
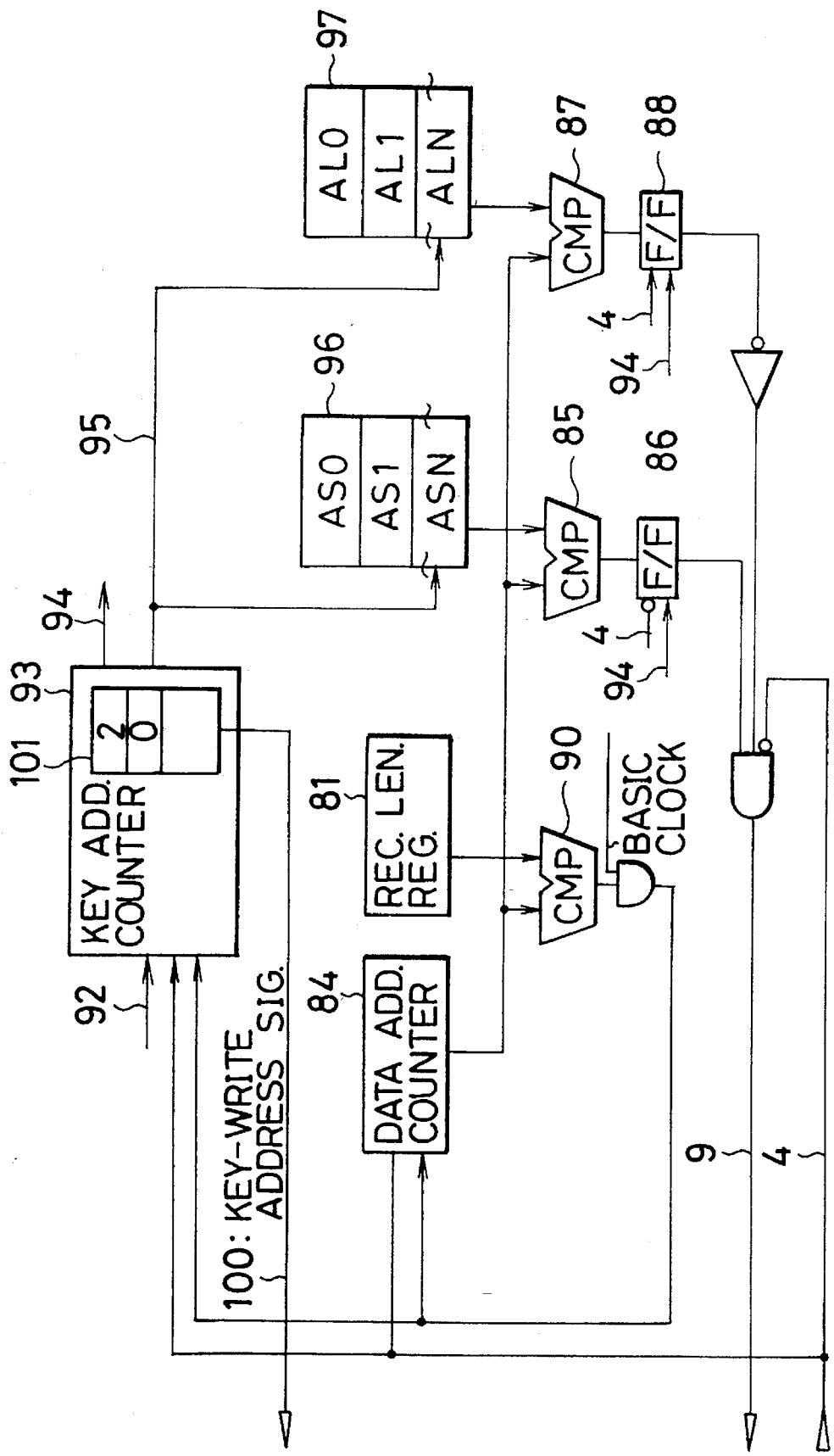
FIG. 7 shows the internal circuit of the key-write controller 8 configured to have keys provided in an arbitrary order in the key memory in accordance with Embodiment 5 of the present invention.

FIG. 7 shows an embodiment wherein the order in which to store keys on the key memory is not the same as the order of the keys in the data. With reference to FIG. 7, the key address counter 93 has a key-write address memory 101. The key-write address memory 101 stores relative address at which to store keys when the record is transferred. The key address counter 93 generates a key-write address signal 100 based on this relative address.

The key-write address memory 101 outputs the key-write address signal 100 to the key memory 7. The key memory 7 stores keys in the address assigned by the key-write address signal 100 from the address memory 101 at the key-write timing signal 9.

Embodiment 6

Figure 8:
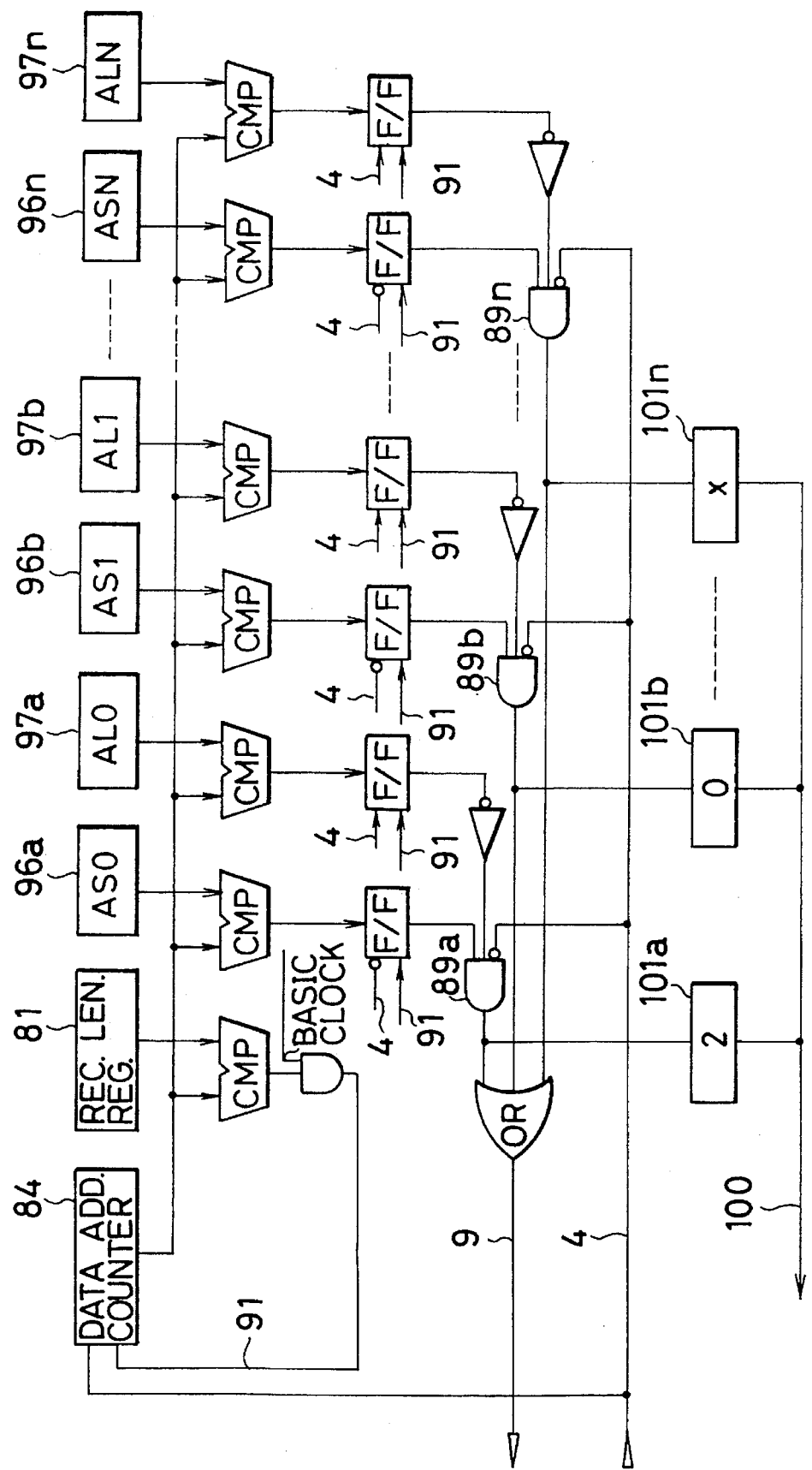
FIG. 8 shows the internal circuit of the key-write controller 8 configured to have plural key-write address memories 101 corresponding to the plural keys in accordance with Embodiment 6 of the present invention.

In accordance with this embodiment, the order in which to store plural keys in the key memory, however, can be also made arbitrary, by making the key memories as separate registers. For example, as shown in FIG. 8, plural keys can be stored in an arbitrary order on the key memory by enabling one of a plurality of key-write address memories 101 separately, the number of which corresponds to the plural keys.

Embodiment 7

The above embodiments have described storing keys on the key memory at times indicated by the data-write timing for writing data on the data memory 5. But it is also possible to store keys on the key memory 7 without a data memory as shown in FIG. 9.

Figure 9:
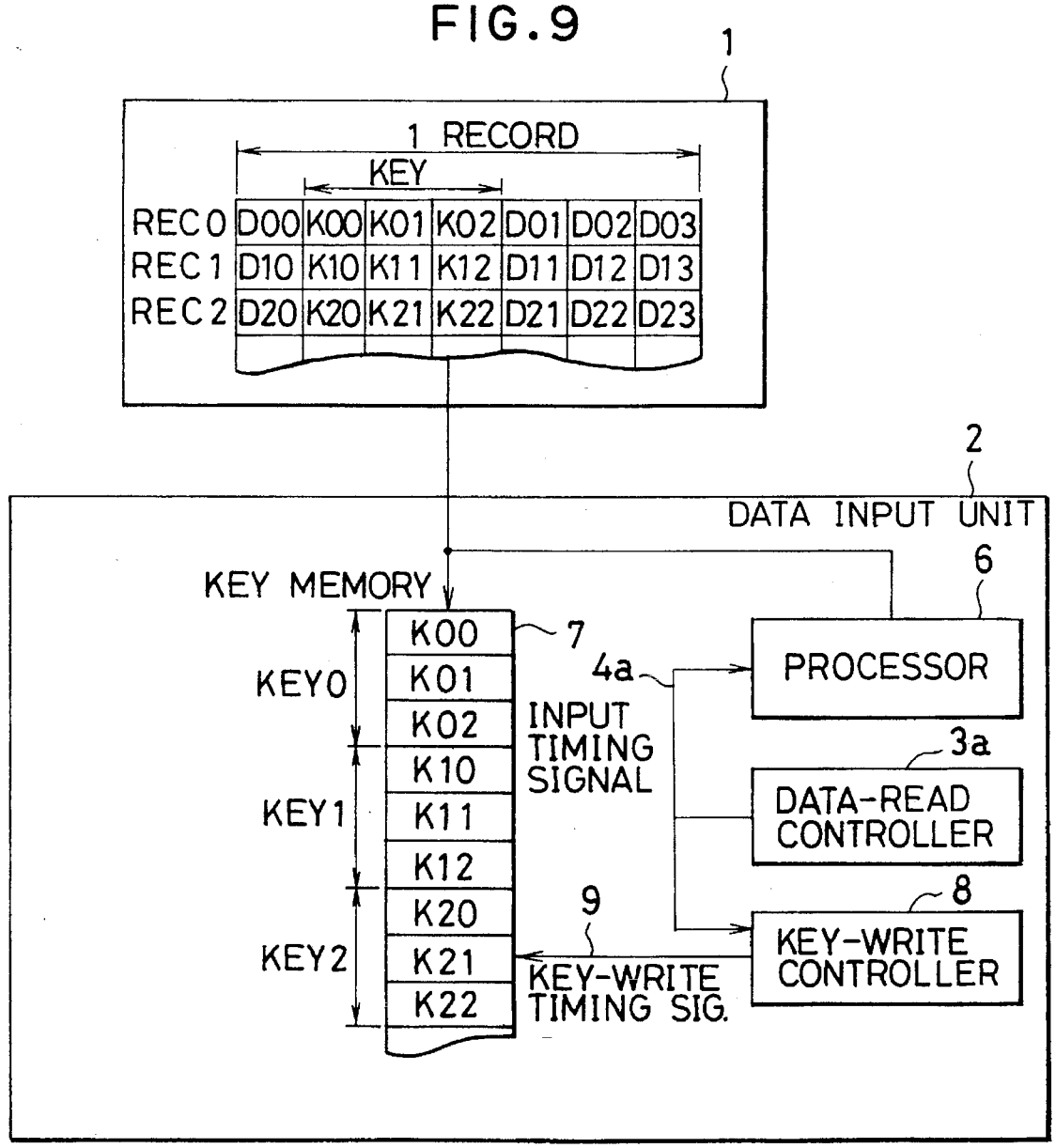
FIG. 9 shows the configuration of the key extraction apparatus in accordance with Embodiment 7 of the present invention.

With reference to FIG. 9, a data-read controller 3a generates an input timing signal 4a for reading data to the processor 6. The processor 6 inputs data from the main memory 1 at times indicated by the input timing signal 4a. The key-write controller 8 inputs the input timing signal 4a. The key-write controller 8 uses this timing signal 4a instead of the data-write timing signal 4 as shown in FIG. 2. If the input timing signal 4a is generated in the same manner as the data-write timing signal 4 as shown in FIG. 3, the key-write controller 8 works in the same way as stated in the above embodiment. In this embodiment, the data memory 5 does not exist, therefore, the data of the record read from the main memory 1 except key data is ignored and abandoned simultaneously with reading.

Embodiment 8

Figure 10:
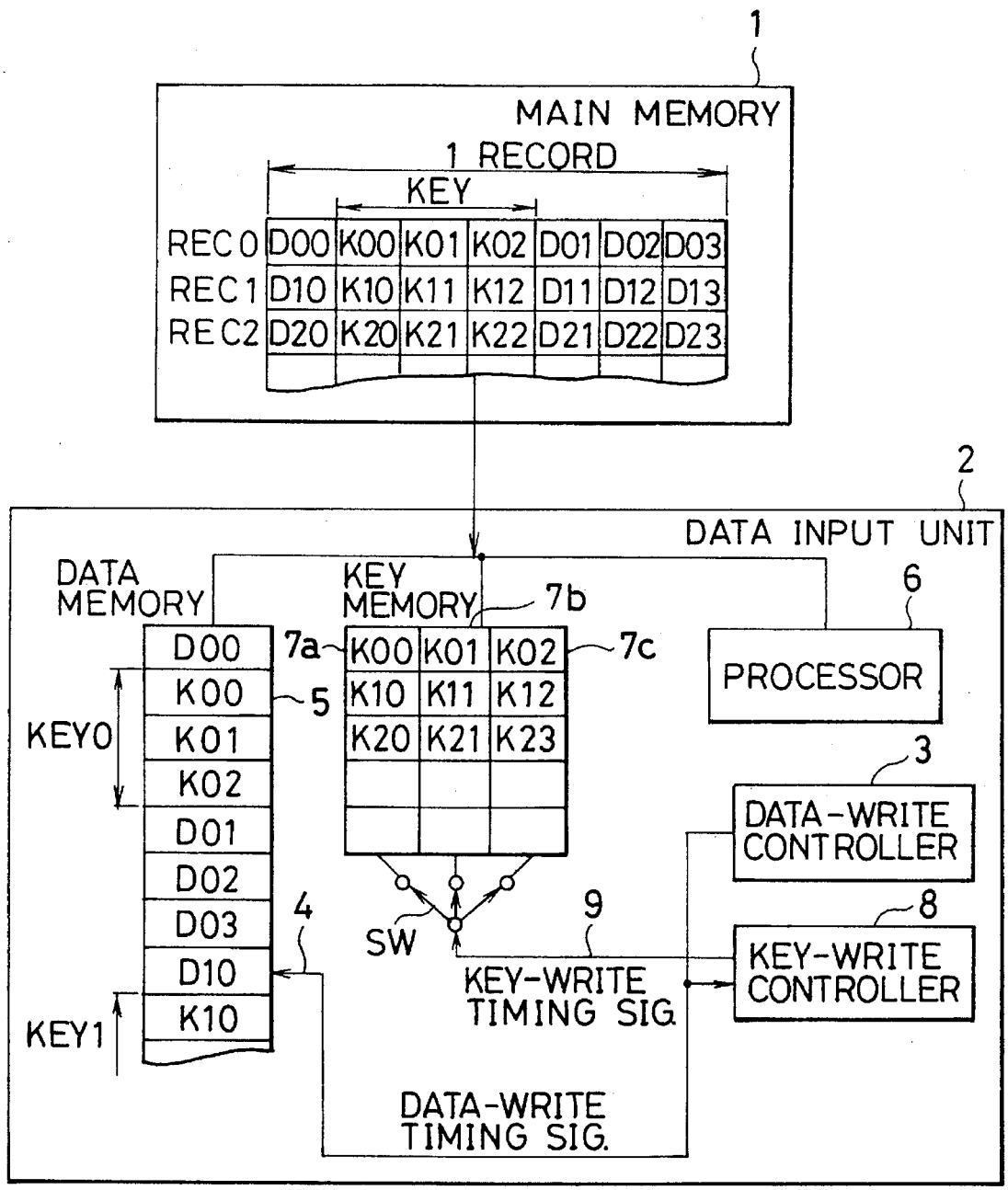
FIG. 10 shows the configuration of the key extraction apparatus in accordance with Embodiment 8 of the present invention.

The above embodiment has one key memory 7. But it is also possible to store keys on plural key memories as shown in FIG. 10. With reference to FIG. 10, the key memory is separated into three parts; a key memory 7a, 7b and 7c. The key-write timing signal 9 selects the key memory 7a, 7b and 7c sequentially by a switch SW. Therefore, the key memory 7a stores only K00, K10 and K20 as keys. Thereafter, each key memory 7a, 7b and 7c can be accessed separately by other program or processing apparatus.

Embodiment 9

This embodiment ignores deleted records while extracting keys from each record.

Figure 11:
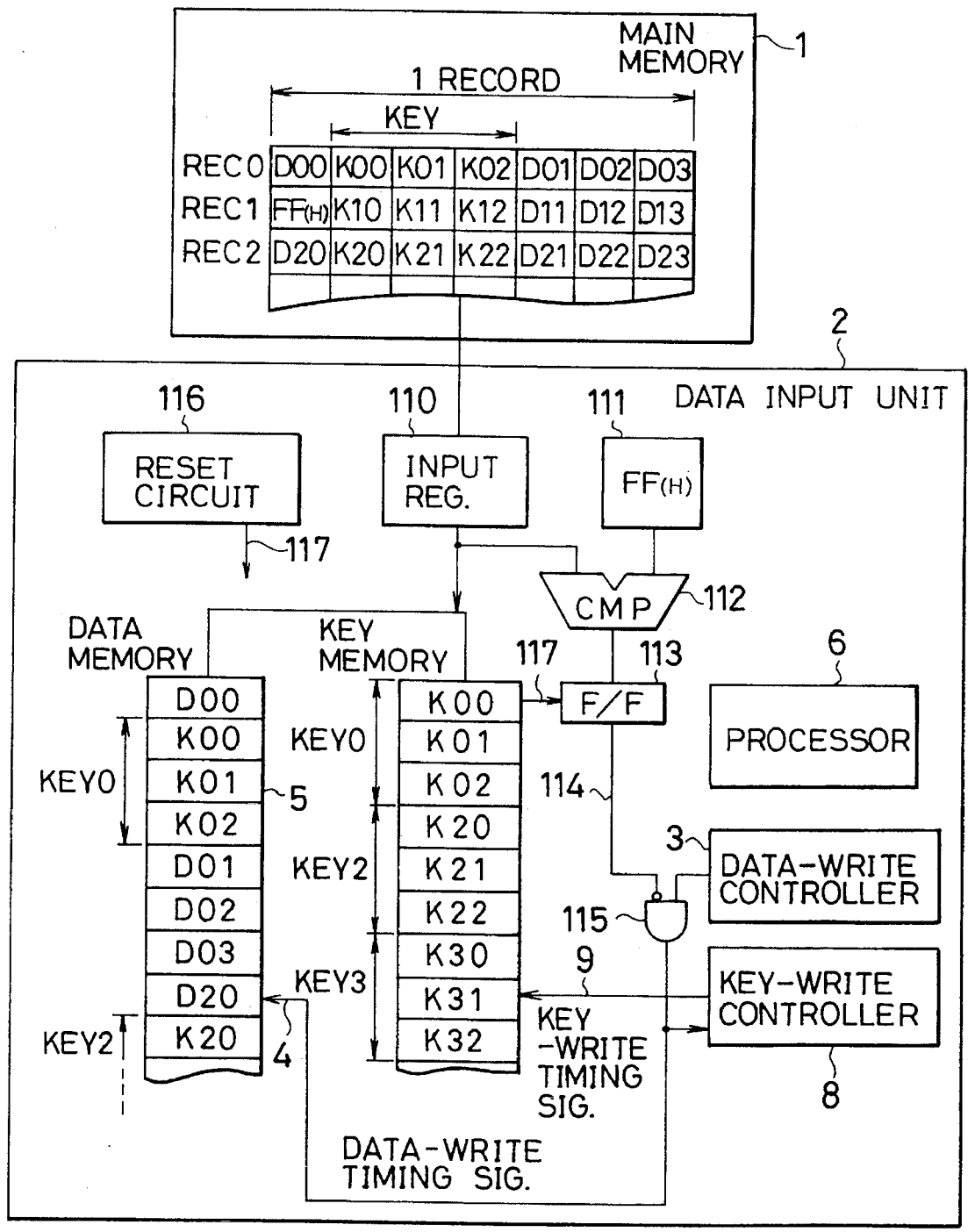
FIG. 11 shows the configuration of the key extraction apparatus in accordance with Embodiment 9 of the present invention.

FIG. 11 shows the configuration of the key extraction apparatus of this embodiment. In this embodiment, it is described hereinafter that the data and the key portion of a deleted record is not stored in the data memory and the key memory when a deleted record is detected.

In this embodiment, it is assumed that a special value, for example FF(H), is written on the first word of the deleted record. In FIG. 11, the second record (REC1) is such a deleted record. The data input unit 2 comprises an input register 110. The input register 110 receives each word sequentially from the main memory 1. The input register 110 works with a clock having a same phase as the data-write timing signal 4 (or the key-write timing signal 9). The data is received by the input register 110 at a time defined by the clock and is outputted to the data memory 5 and the key memory 7 from the input register 110 at a subsequent time defined by the clock. A register 111 is preset to, and holds, a special value, in this example FF(H). A comparator 112 compares the data received by the input register 110 and the value FF(H) held in the register 111. If they are equal, a flip-flop 113 holds a comparison result. The flip-flop 113 outputs a detect signal 114 to an AND gate 115. The AND gate 115 suspends the data-write timing signal 4 from the data-write controller 3 while the signal 114 is asserted. Therefore, the data-write timing signal 4 is not outputted to the data memory 5 while the signal 114 is asserted. As a result, the data memory 5 does not store the data from the input register 110. And the key-write controller 8, which works based on the data-write timing signal 4, does not work. Therefore, the key-write timing signal 9 is not generated, so that the key memory does not store the data from the input register 110.

While the first record (REC0) in FIG. 11 is inputted, the comparator 112 does not detect the special value FF(H). In the same manner as described in the above embodiment, the data memory 5 stores all the words of the first record and the key memory 7 stores KEY0 (K00, K01, K02).

When the first word of the second record is inputted, the comparator 112 detects FF(H) and outputs a comparison result to the flip-flop 113. The flip-flop 113 outputs a detect signal 114. This signal 114 remains asserted until the reset of the flip-flop 113. A reset circuit 116 detects the end of each record and generates a reset signal 117 at the end of each record transfer. The reset circuit 116 can be configurated with the beforementioned component such as the data address counter 84, the record length register 81, the comparator 90 and so on.

When the reset circuit 116 generates the reset signal 117, the flip-flop 113 is reset and the detect signal 114 is deasserted.

In this way, the flip-flop 113 asserts the detect signal 114 from the first word of the second record to the last word of the second record. Accordingly, the data memory 5 does not store all the words of the second record and the key memory 7 does not store the key portion (K10, K11, K12) of the second record.

Embodiment 10

This embodiment ignores the key portion of deleted records by suspending the key-write timing signal 9.

Figure 12:
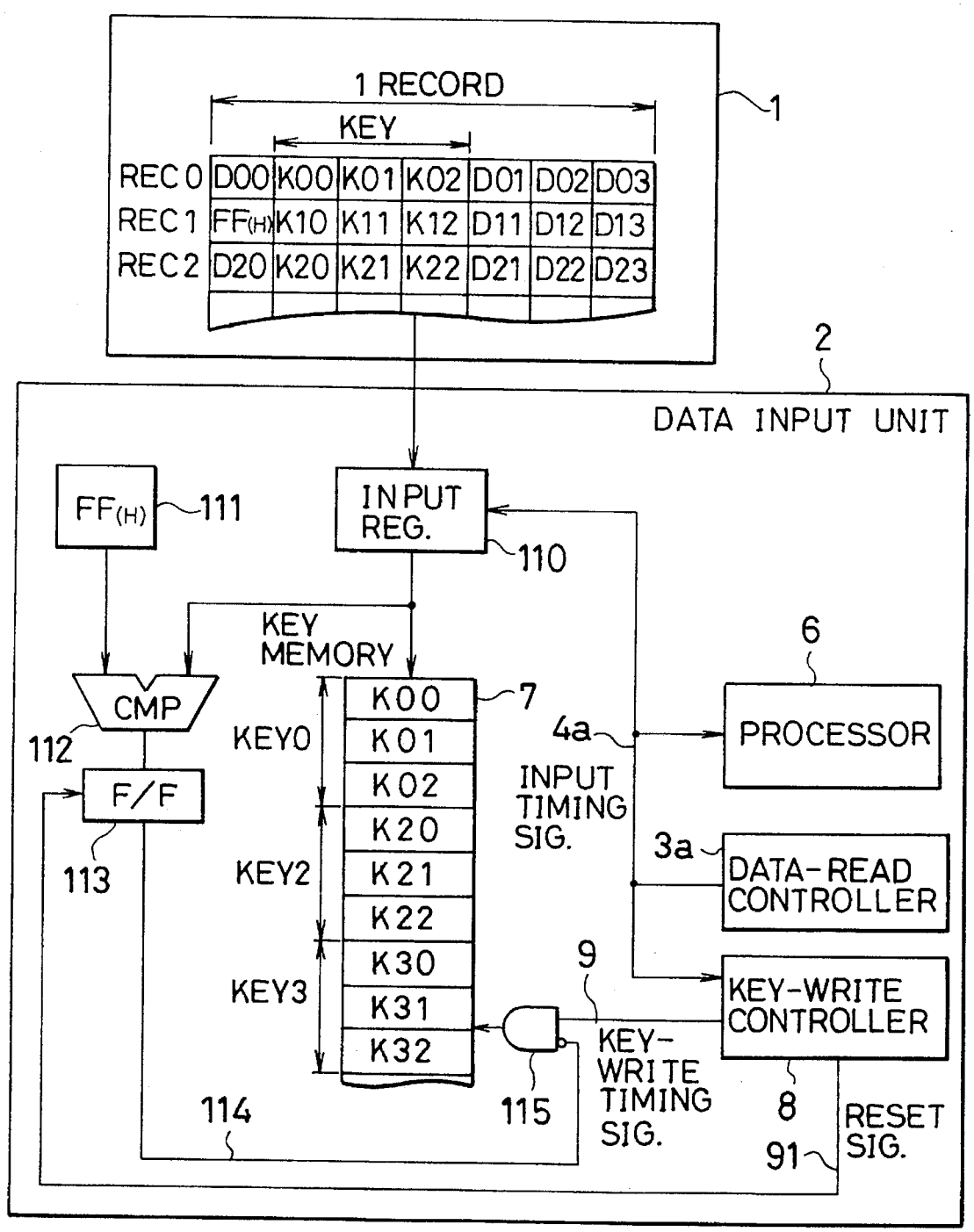
FIG. 12 shows the configuration of the key extraction apparatus in accordance with Embodiment 10 of the present invention.

One difference between FIG. 12 and FIG. 11, explained above, is that one of the inputs of the AND gate 115 is the key-write timing signal 9 in FIG. 12. Another difference is that in FIG. 12 the reset signal 91 generated by the key-write controller 8 is used as a reset signal of the flip-flop 113. In this embodiment, when the first word of the second record (REC1) is received, the flip-flop 113 outputs the detect signal 114 and suspends the key-write timing signal 9.

The flip-flop 113 asserts the detect signal 114 until the key-write controller 8 generates the reset signal 91 which indicates the end of the record. Accordingly, the key memory 7 does not store the key portion of the second record (REC1).

Embodiment 11

In the above embodiments 9 and 10, it has been described that the data and/or the key portion of a deleted record may be ignored. However, records to be ignored need not be limited to deleted records. Namely, it is possible to apply the above method in a record selection process, which depends on whether a record has a certain special value therein or not. For example, if the record has a word which indicates "male" or "female", it is possible to select records having a "male" indication and extract the key portion of the selected records.

Embodiment 12

In this embodiment, storing keys along with additional information in the key memory is shown.

Figure 13:
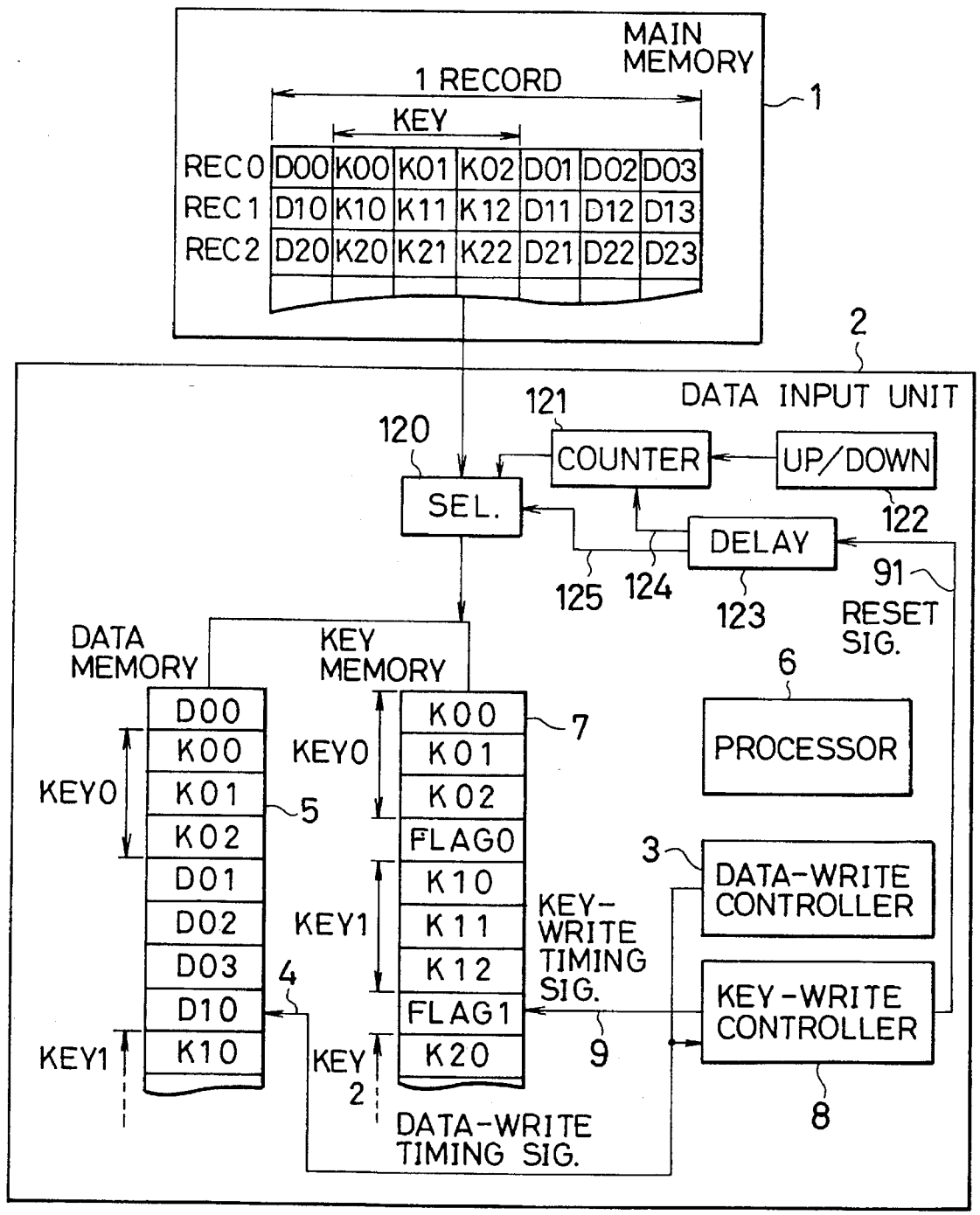
FIG. 13 shows the configuration of the key extraction apparatus in accordance with Embodiment 12 of the present invention.

FIG. 13 shows this embodiment. A flag 0 and a flag 1 are written in the key memory 7 as well as keys. These flag 0 and flag 1 may be IDs of the record. For example, they may be serial numbers. The serial number may be assigned sequentially whenever a new record is inputted. By storing a serial number corresponding to the record with the key, it is possible to sort keys in ascending/descending order of inputting of the record in case there exist multiple keys having the same value.

A counter 121 increments or decrements the counter value at each record transfer, An up-down selector 122 selects increment or decrement of the counter value of the counter 121, It is described hereinafter the case of incrementing the counter value sequentially from "1".

A selector 120 selects and outputs either the data inputted from the main memory 1 or the counter value outputted from the counter 121. The selector 120 selects and outputs the value of the counter 121 after the transfer of each record. The key-write controller 8 generates an additional key-write timing signal 9 at the end of the first record transfer.

Based on the reset signal 91 from the key-write controller 8, a delay circuit 123 outputs a one clock delay signal 125, which is delayed one clock period from the reset signal 91, to the selector 120. The selector 120 outputs the counter value of the counter 121 at the time of this one clock delay signal 125. Accordingly, the key memory 7 can store the counter value as a flag during one clock period after the transfer of one record. The delay circuit 123 outputs a two clock delay signal 124, which is delayed two clock periods from the reset signal 91, to the counter 121. The counter 121 increments the counter value based on this two clock delay signal 124.

An example is described hereinafter. While each word of the first record (REC0) is inputted to the selector 120, the counter 121 holds the counter value "1". After the transfer of the first record, the delay circuit 123 outputs the one clock delay signal 125 to the selector 120. The selector 120 inputs the counter value "1" from the counter 121 and outputs it to the key memory 7. The key-write controller 8 generates an additional key-write timing signal 9 based on the reset signal 91. Accordingly, the counter value "1" is stored in the flag 0 of the key memory 7.

The delay circuit 123 outputs the two clock delay signal 124 to the counter 121 and the counter increments the counter value to "2". The first word of the second record (REC1) is inputted simultaneously with this increment of the counter value. While each word of the second record is inputted, the counter 121 holds the value "2". After the transfer of the second record, the selector 120 selects and outputs the counter value "2" from the counter 121 based on the one clock delay signal 125 of the delay circuit. As a result, the counter value "2" is stored in the flag 1.

As stated above, by appending flag 0, flag 1 and so on to each key, special data processing is possible using the counter value of these flags.

Embodiment 13

In this embodiment, one flag is appended to each of plural keys extracted from each record when the record has plural keys.

Figure 14:
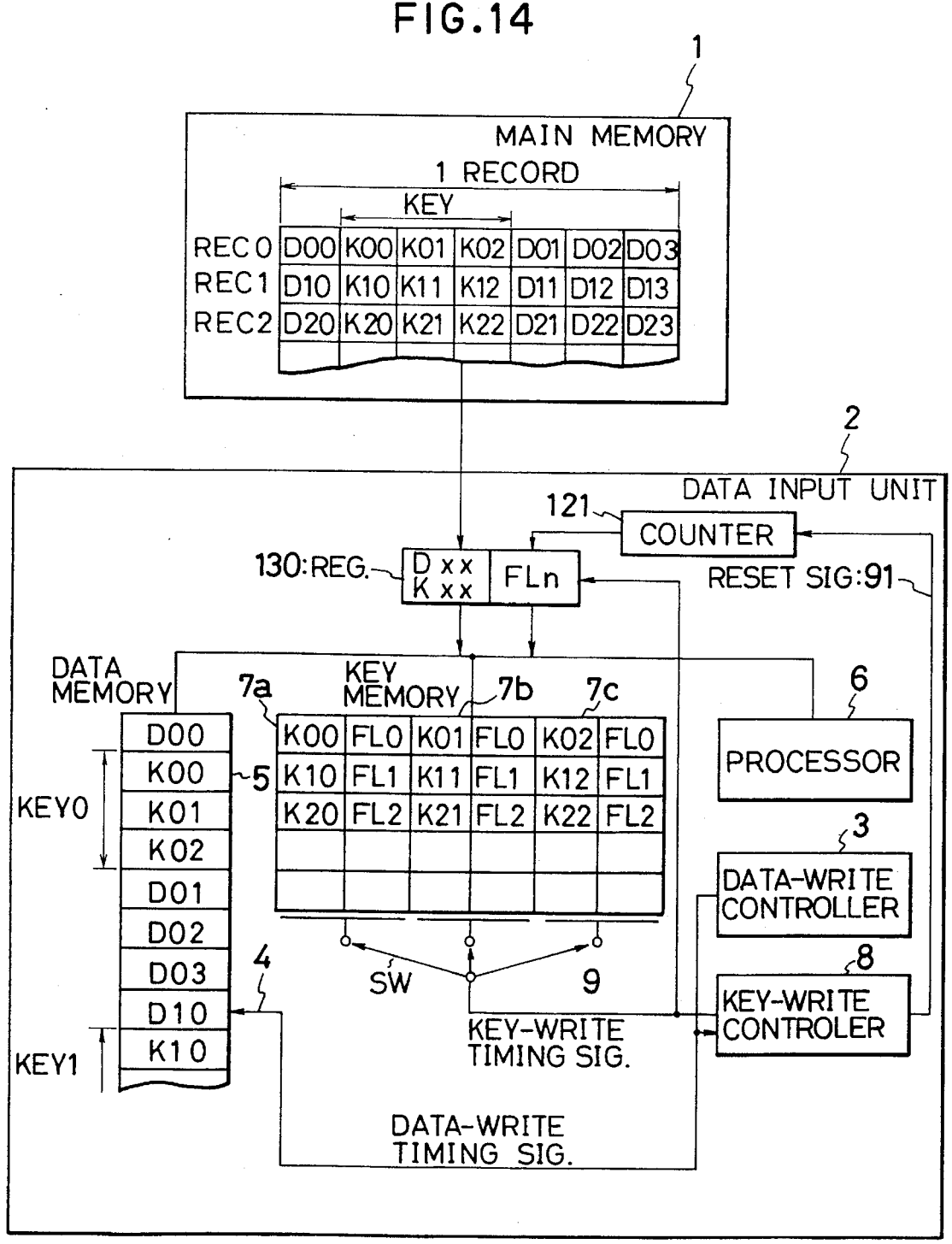
FIG. 14 shows the configuration of the key extraction apparatus in accordance with Embodiment 13 of the present invention.

FIG. 14 shows this embodiment. A register 130 comprises a data part for holding the data from the main memory 1 and a count part for holding the counter value of the counter 121. Usually, the count part of the register 130 does not output the counter value. It outputs the counter value when the key-write timing signal 9 is generated. The count part of the register 130 does not output the counter value when the key-write timing signal 9 is not generated. Both of the data and the counter value of the register 130 are outputted to the key memory 7 when the key-write timing signal 9 is generated.

The key memory 7 consists of three parts; 7a, 7b and 7c. Each of them comprises a key part for holding keys and a flag part for holding flags. Accordingly, flags are held corresponding to each key.

By providing the key memory as stated above, it is possible to identify which record the key is extracted from based on the counter value of the flag. It is also possible to unite plural keys extracted from the same record by using flags even after independent data processing to each of the key memories 7a, 7b or 7c.

Embodiment 14

Figure 15:
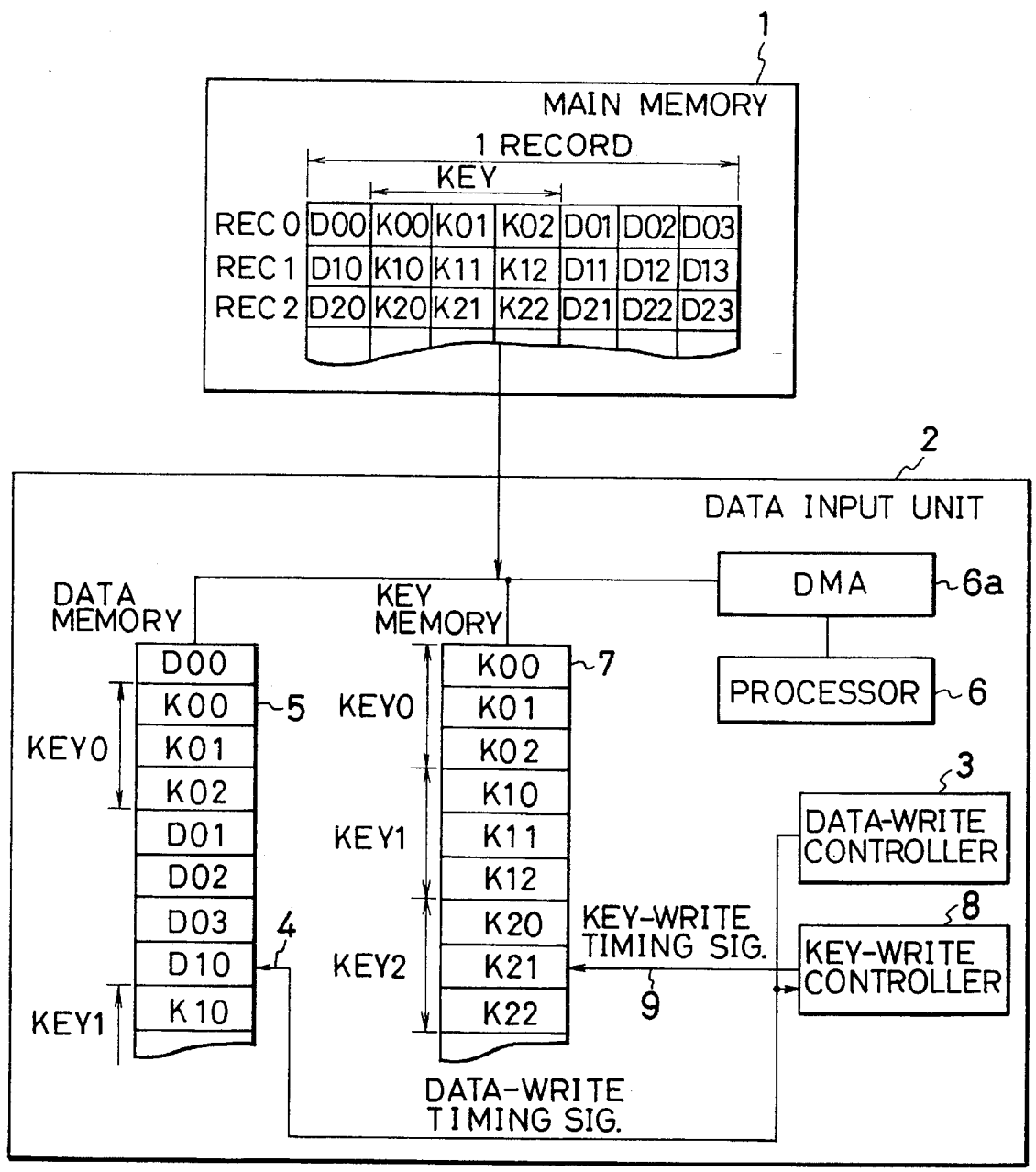
FIG. 15 shows the configuration of the key extraction apparatus in accordance with Embodiment 14 of the present invention.
Figure 16:
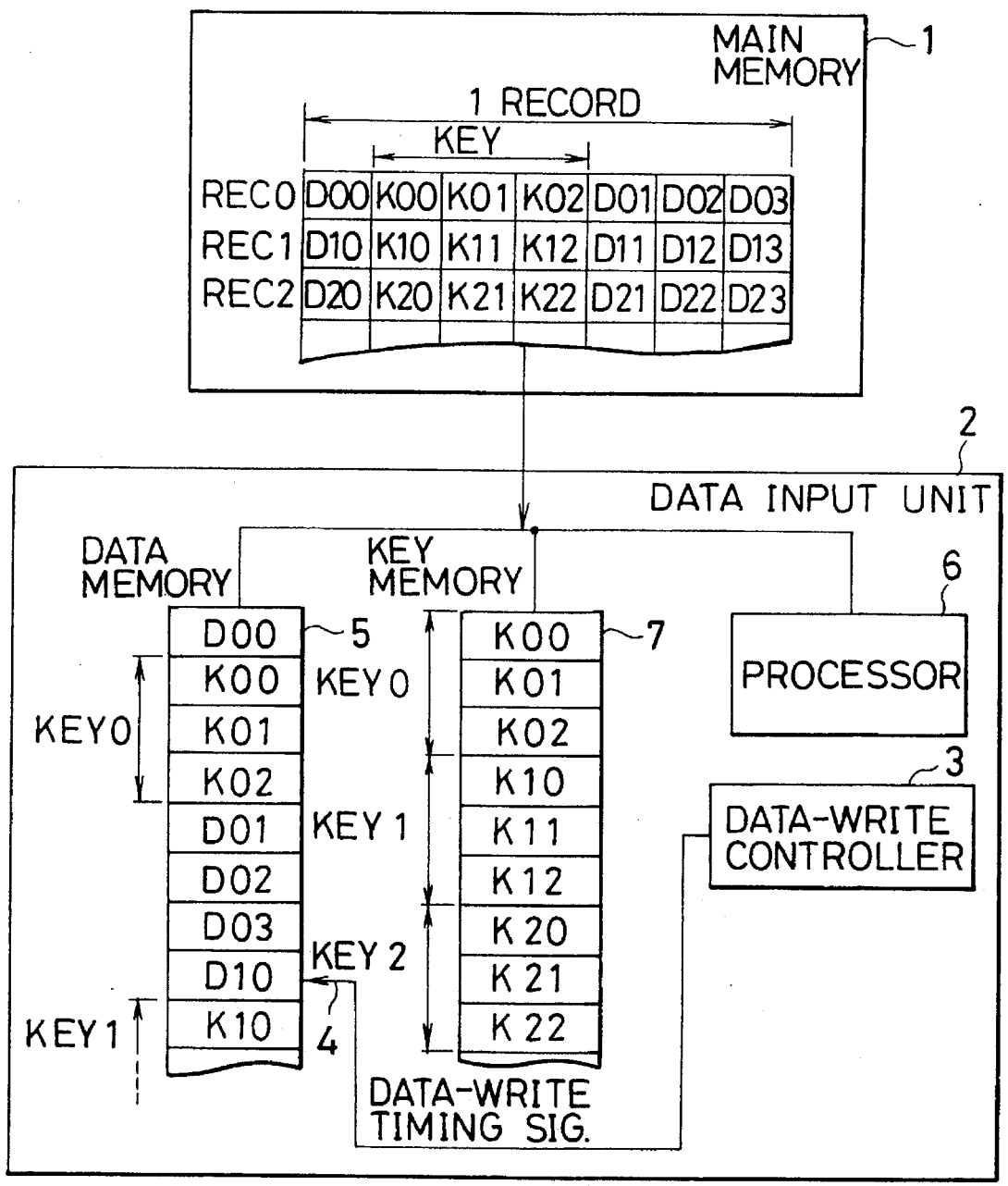
FIG. 16 shows the configuration of a conventional key extraction apparatus.

FIG. 15 shows another example of the key extraction apparatus of this invention. In the embodiment described above, the processor inputs the data from the main memory 1. It is also possible to provide DMA (Direct Memory Access) for inputting the data instead of the processor 6 as shown in FIG. 15.

Embodiment 15

As has been described, the above embodiment shows the key extraction apparatus in case of sort processing. But this invention is also effective in case of extracting some special part or item from any kind of data, for example; to extract the employee numbers and names from a personnel record.

This invention is also effective in case of building a new data base with special data extracted from an existing data base. For example, by using the data base processing language SQL, a virtual table (this is called VIEW) is built from existing tables. This VIEW is virtual and is not actually written, therefore, it is built by retrieving data from written tables whenever it is required. Or, VIEW is stored temporarily in a main memory or a cache memory and so on. In this way, it is required to build a virtual table temporarily and frequently from existing tables. By using the key extracting method described in the above embodiment, this virtual table, VIEW, can be built and retrieved at a high speed.

As stated above, in this invention, a key means not only a sort key but a special part or item of any kind of data.

Embodiment 16

The above embodiment has described the case that each record consists of word units. The element of one record, however, can be other unit, for example; byte unit or bit unit. When one record consists of byte units or bit units, the key-top address register 82, the key-end address register 83 and the data address counter 84 hold and count addresses by byte unit or bit unit.

The present invention has been described in connection with a number of specific embodiments thereof. Numerous extensions, modifications, and variations obvious to those skilled in the art are also contemplated by the invention. Thus, the above description is given by way of example, only, and the present invention is not to be limited thereby, but to be limited only by the scope of the appended claims.

What is claimed is:

1. A key extraction apparatus, comprising:

data input means for inputting data having a key portion therein;

data memory means for storing said data:

data writing means for serially writing said data to said data memory means;

key memory means for storing said key portion; and key writing means for writing said key portion of said data to said key memory means simultaneously with inputting said data of said data input means.

2. The key extraction apparatus of claim 1, wherein said data input means inputs a plurality of records as said data, each of which has a fixed record length and includes said key portion at a predefined key position, and said key writing means extracts said key portion from each record inputted by said data input means.

3. The key extraction apparatus of claim 2, wherein said key writing means comprises:

(a) key position memory means for storing said key position of said key portion, (b) count means for counting a data position of said record inputted by said data input means;

(c) comparison means for comparing said key position and data position; and (d) signal means for outputting a timing signal to said key writing means to write data to said key memory means.

4. The key extraction apparatus of claim 3, wherein said key writing means further comprises reset means for storing said record length, and resetting said key writing means when said data position counted by said count means reaches said record length.

5. The key extraction apparatus of claim 3, wherein said key position memory means stores a relative address of said key portion in said record as said key position, and said count means counts a relative address of said data in said record as said data position.

6. The key extraction apparatus of claim 3, wherein said key position memory means stores a key-top position and a key-end position as said key position.

7. The key extraction apparatus of claim 3, wherein each of said records has a plurality of key positions, and said key position memory means stores a plurality of key positions.

8. The key extraction apparatus of claim 7, wherein said key writing means further comprises key write position memory means for storing a plurality of key write positions each of which corresponds to each of said key portions in said record and indicates a position in said key memory means at which to store said corresponding key portion, and said signal means selects one of said key write positions stored by said key write position memory means, corresponding to said key portion to be stored by key memory means, and outputs said key write position selected to said key writing means when outputting said timing signal.

9. The key extraction apparatus of claim 3, wherein said comparison means comprises a comparator for comparing said key position stored by said key position memory means and said data position counted by said count means, and hold means for holding a comparison result of said comparator, and said signal means outputs said comparison result to said key memory means in parallel with inputting data of said data input means.

10. The key extraction apparatus of claim 2, further comprising a compare means for comparing the record with a predefined value, and prohibiting means for letting said key memory means prohibit storage of said key portion based on a comparison result of said compare means.

11. The key extraction apparatus of claim 2, further comprises an ID means for writing an identification of said record with said key portion when said key writing means writes said key portion to said key memory means.

12. A sort processing system comprising;

said key extraction apparatus of claim 1; and sort means for sorting said key portion stored by said key memory means.

13. A data base processing system comprising;

said key extraction apparatus of claim 1; and access means for accessing said key portions stored by said key memory means as a file.

14. A key extraction method comprising the steps of:

inputting data serially, the data serially input containing a key portion;

writing the data serially input to a data memory;

judging the key portion of said data serially input; and, based on a judgement of said judging step, extracting the key portion of said data and writing the key portion to a key memory simultaneously with the step of writing the data to a data memory.

15. The key extraction method of claim 14, further comprising the step of:

storing a key position of said data before said inputting step; and wherein said judging step refers said key portion stored by said storing step and judges said key portion of said data.

16. The key extraction method of claim 14, further comprising the step of:

repeating said inputting step, judging step and extracting step for extracting a plurality of key positions.

17. The key extraction method of claim 16, further comprising the step of:

outputting a key memory position for storing said key portion when said extracting step extracts said key portion.

18. The key extraction method of claim 16, further comprising the step of:

resetting said inputting step, judging step and extracting step for a new record wherein said inputting step inputs a plurality of records.

19. The key extraction method of claim 17, further comprising the step of:

storing said data inputted by said inputting step.

20. A key extraction apparatus, comprising:

an input port through which is received a series of data elements, the data elements including key elements;

a data memory connected to receive data elements from the input port;

a key memory connected to receive data elements from the input port;

a data write controller, having write control outputs connected to the data memory to cause a data memory write for each data element received from the input port; and a key write controller, having write control outputs connected to the key memory to cause a key memory write for each key element received from the input port, the key memory write occurring substantially simultaneously with a corresponding data memory write.

21. The key extraction apparatus of claim 20, wherein the input port receives a plurality of records having a fixed record length and including a key portion at a predefined key position as said series of data, and wherein the key write controller extracts the key portion from each record received.

22. The key extraction apparatus of claim 21, wherein the key write controller further comprises:

a key position memory in which the key position of the key portion is stored;

a counter connected to be incremented for each element of a record received;

a comparator connected to compare a value of the counter with the key position stored in the key position memory; and an output signal generator responsive to the comparator which produces an output signal indicative of elements of the record received falling within the key portion.

23. The key extraction apparatus of claim 22, wherein the key write controller further comprises:

a record length memory in which the record length is stored; and a reset generator which generates a reset of the key write controller when the counter reaches a value which exceeds the record length stored in the record length memory.

24. The key extraction apparatus of claim 22, wherein the key position memory and the counter use relative addressing to refer to the key position.

25. The key extraction apparatus of claim 22, wherein the key position memory stores a key-top position and a key-end position as the key position.

26. The key extraction apparatus of claim 22, wherein each record includes a plurality of keys at a plurality of key positions, and wherein the key position memory further comprises:

storage locations for a plurality of key positions.

27. The key extraction apparatus of claim 26, wherein the key write controller further comprises:

a selector for selecting one of the storage locations in the key position memory for obtaining the key position input to the comparator.

28. The key extraction apparatus of claim 21, further comprising:

a record comparator receiving the record as a first input and receiving a predefined value as a second input, and producing an output to the key write controller prohibiting storage of the key portion on the basis of a comparison of the record and the predefined value.

29. A key extraction apparatus, comprising:

data input means for inputting data having key portion therein;

key memory means for storing said key portion;

key writing means for writing said key portion of said data to said key memory means in parallel with inputting said data of said data input means;

key position memory means for storing said key position of said key portion;

count means for counting a data position of said record inputted by said data input means;

comparison means for comparing said key position and data position; and signal means for outputting a timing signal to said key writing means to write data to said key memory means, wherein said data input means inputs a plurality of records as said data, each of which has a fixed record length and includes said key portion at a predefined key position, data input means.

30. The key extraction apparatus of claim 29, further comprising:

data memory means for storing said data; and data writing means for writing said data to said data memory means in parallel with inputting said data of said data input means.

31. The key extraction apparatus of claim 29 or 30, wherein said key writing means further comprises reset means for storing said record length, and resetting said key writing means when said data position counted by said count means reaches said record length.

32. The key extraction apparatus of claim 29 or 30, wherein said key position memory means stores a relative address of said key portion in said record as said key position, and said count means counts a relative address of said data in said record as said data position.

33. The key extraction apparatus of claim 29 or 30, wherein said key position memory means stores a key-top position and a key-end position as said key position.

34. The key extraction apparatus of claim 29 or 30, wherein each of said records has a plurality of key positions, and said key position memory means stores a plurality of key positions.

35. The key extraction apparatus of claim 29 or 30, wherein said key writing means further comprises key write position memory means for storing a plurality of key write positions each of which corresponds to each of said key portions in said record and indicates a position in said key memory means at which to store said corresponding key portion, and said signal means selects one of said key write positions stored by said key write position memory means, corresponding to said key portion to be stored by key memory means, and outputs said key write position selected to said key writing means when outputting said timing signal.

36. The key extraction apparatus of claim 29 or 30, wherein said comparison means comprises a comparator for comparing said key position stored by said key position memory means and said data position counted by said count means, and hold means for holding a comparison result of said comparator, and said signal means outputs said comparison result to said key memory means in parallel with inputting data of said data input means.

37. A key extraction apparatus, comprising:

data input means for inputting data having key portion therein;

key memory means for storing said key portion;

key writing means for writing said key portion of said data to said key memory means in parallel with inputting said data of said data input means, wherein said data input means inputs a plurality of records as said data, each of which has a fixed record length and includes said key portion at a predefined key position, and said key writing means extracts said key portion from each record inputted by said data input means, further comprising a compare means for comparing the record with a predefined value, and prohibiting means for letting said key memory means prohibit storage of said key portion based on a comparison result of said compare means.

* * * * *